US008260832B2

(12) United States Patent
Murthy

(10) Patent No.: US 8,260,832 B2
(45) Date of Patent: Sep. 4, 2012

(54) MANAGING LARGE COLLECTION OF INTERLINKED XML DOCUMENTS

(75) Inventor: Ravi Murthy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 906 days.

(21) Appl. No.: 11/959,288

(22) Filed: Dec. 18, 2007

(65) Prior Publication Data

US 2009/0157715 A1 Jun. 18, 2009

(51) Int. Cl.
*G06F 17/30* (2006.01)
(52) U.S. Cl. ........................................................ 707/825
(58) Field of Classification Search ............... 707/2, 825
See application file for complete search history.

(56) References Cited

U.S. PATENT DOCUMENTS 7,356,549 B1 * 4/2008 Bruso et al. .................... 707/696
2006/0253418 A1 * 11/2006 Charnock et al. ................. 707/1

OTHER PUBLICATIONS

Junghoo Cho, Parallel Crawler, May 2, 2005, ACM.*

* cited by examiner

*Primary Examiner* — James Trujillo
*Assistant Examiner* — Amresh Singh
(74) *Attorney, Agent, or Firm* — Hickman Palermo Truong Becker Bingham Wong LLP

(57) ABSTRACT

An approach is provided to partition inter-linked documents into partitions of a database system. In some embodiments, a plurality of documents may be assigned to two or more partitions in the database system, thereby forming a number of inter-partition links between a first partition and a second partition. Here both the first partition and the second partition are in the two or more partitions. First documents may be assigned to the first partition while second documents are assigned to the second partition. Both the first documents and the second documents are in the plurality of documents. It is then determined whether moving one or more of the first documents in the first partition to the second partition reduces the number of inter-partition links between the first partition and the second partition. If that is the case, the one or more of the first documents are moved to the second partition.

20 Claims, 7 Drawing Sheets

MANAGING LARGE COLLECTION OF INTERLINKED XML DOCUMENTS

FIELD OF THE INVENTION

The present invention relates to database systems and, more specifically, database systems that support managing and partitioning large collection of interlinked XML documents.

BACKGROUND

More and more information is being stored in XML documents. Quite often, an XML documents may have links that point to other documents (which may be considered as a directed edge between two nodes/documents). These links may point to a whole XML document or one or more fragments in XML documents. XLink and related standards such as XInclude and XPointer may be used to define the links. As an example, a personnel database may be used to store a collection of XML documents each of which represents an employee or a department. An employee document may have a manager link embedded therein that points to another employee document that represents a manager. Additional links may be embedded in an employee document. For example, besides the manager link, the former employee document may comprise another link, say department link, that points to a department document that represents a department.

Operations that involve traversing links may be performed on a collection of interlinked XML documents. An example of interesting operation may be a query that returns a listing of employee-name and manager-name pairs. The straightforward evaluation of this query may require iteration over all employee documents; for each employee-name found in each employee document, a manager link in the employee document may be traversed to retrieve a corresponding manager-name.

In many scenarios, the number of documents in such collections is very large—perhaps in terms of millions. It becomes inefficient (and in some cases infeasible) to operate on such a collection using a single computer or only a small set of computers. It is thus necessary to split the collection over multiple machines in smaller collections (i.e. partitions) to enable parallel concurrent processing.

A disadvantage of these approaches, however, is that XML documents interlinked may end up in different partitions. As a result, the cost of traversing links may be increased because of the performance degradation caused by excessive traversal of links across partition boundaries.

Therefore, a better mechanism, which would better support managing and partitioning large collection of interlinked XML documents, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
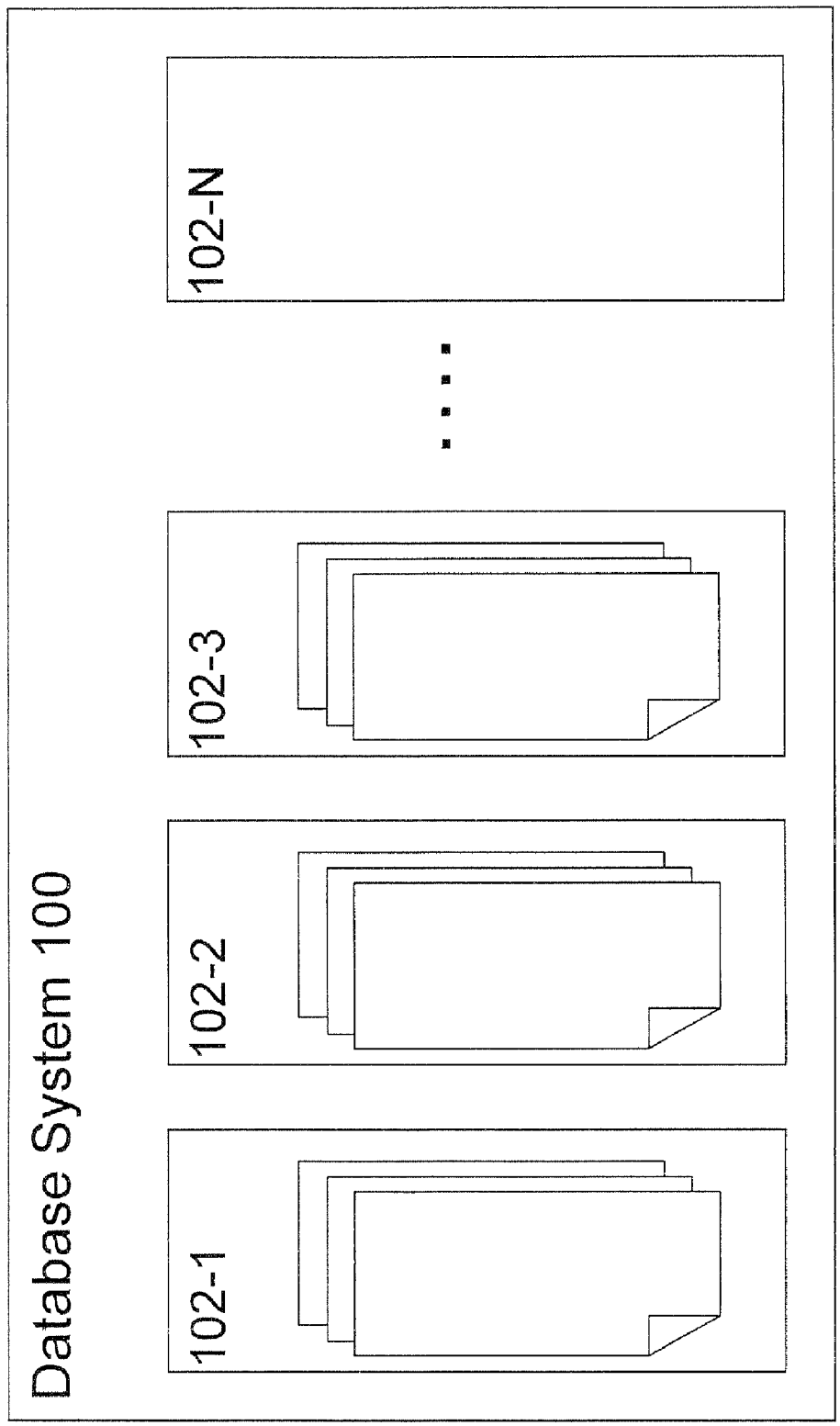
FIG. 1 is a block diagram of an example database system in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a partitioning mechanism may be implemented in a database system for partitioning inter-linked documents into two or more partitions of a database system.

Documents in a plurality of documents are initially assigned by the partitioning mechanism to two or more partitions in the database system. As a result, a number of inter-partition links are formed between a first partition and a second partition. Here, both the first partition and the second partition are in the two or more partitions. In an embodiment, first documents can be assigned to the first partition, while second documents can be assigned to the second partition; both the first documents and the second documents are part of the plurality of documents.

Subsequently, the partitioning mechanism determines whether moving one or more of the first documents in the first partition to the second partition reduces the number of inter-partition links between the first partition and the second partition. To make this determination, the partitioning mechanism may determine, for each document in the one or more of the first documents in the first partition, whether moving that document to the second partition reduces the number of inter-partition links between the first partition and the second partition.

Alternatively, the partitioning mechanism may determine, for each document type, whether moving (documents of) that document type to the second partition reduces the number of inter-partition links between the first partition and the second partition. For example, the plurality of documents can be of two or more document types. Accordingly, to determine whether moving one or more of the first documents in the first partition to the second partition reduces the number of inter-partition links between the first partition and the second partition, the partitioning may determine, for each document type in the two or more document types, whether moving documents of that document type to the second partition reduces the number of inter-partition links between the first partition and the second partition.

To determine whether moving one or more of the first documents in the first partition to the second partition reduces the number of inter-partition links between the first partition and the second partition, the partitioning may determine how many current inter-partition links may become intra-partition links and how many current intra-partition links may become inter-partition links. By comparing these two types of link changes, the partitioning mechanism determines whether to move or not to move a particular document, a particular document type, etc.

In some embodiments, each of the inter-partition and intra-partition links may be assigned a weight factor. In some embodiments, each link of a same type may be assigned a same weight factor as all other links of the same type. In some embodiments, the weight factor assigned to each of the links depends on a namespace specified in that link. In some embodiments, the weight factor assigned to each of the links depends on how many traversals were made by one or more users of the database system on a type of link to which that link belongs.

In the embodiments where weight factors are used, determining whether moving one or more of the first documents in the first partition to the second partition reduces the number of inter-partition links between the first partition and the second partition, as mentioned above, is the same as determining whether moving one or more of the first documents in the first partition to the second partition reduces a weighted summation of all numbers of inter-partition links, as weighted by multiplication with their weight factors, between the first partition and the second partition. Therefore, in some embodiments, some links may be fully accounted for in this determination if their weight factors are one; some links may be ignored in the same determination if their weight factors are zero; and still some links may be partially accounted for in the determination if their weight factors fall somewhere between zero and one.

In an embodiment, the partitioning mechanism, in response to determining that moving the one or more of the first documents in the first partition to the second partition reduces the number of inter-partition links between the first partition and the second partition, moves the one or more of the first documents to the second partition.

This process of determining whether a document should be moved from the first partition to the second partition may be repeated by the partitioning mechanism for all the documents initially assigned into the first partition.

In some embodiments, the partitioning mechanism also determines whether moving one or more of the second documents in the second partition to the first partition reduces the number of inter-partition links between the first partition and the second partition. This may be performed in the same manner as described above with respect to the documents initially assigned to the first partition.

The partitioning mechanism, in response to determining that moving the one or more of the second documents in the second partition to the first partition reduces the number of inter-partition links between the first partition and the second partition, moves the one or more of the second documents to the first partition.

While partitioning or re-partitioning the collection of interlinked documents, the partitioning mechanism in some embodiment may continually receive one or more new documents to be stored and managed in the database system. In a particular embodiment, a new partition in the database system may be designated and used to receive these new documents. Since the new documents are interlinked documents themselves, a number of new inter-partition links between the new partition and the two or more partitions other than the new partition may be created.

In some embodiments, the partitioning mechanism performs, for each partition in the two or more partitions, the following steps. The partitioning mechanism first determines whether moving one or more of the new documents in the new partition to that partition in the two or more partitions reduces the number of new inter-partition links between the new partition and that partition. In response to determining that moving the one or more of the new documents in the new partition to that partition reduces the number of new inter-partition links between the new partition and that partition, the partitioning mechanism moves the one or more of the new documents to that partition.

In some embodiments where, while partitioning or re-partitioning the collection of interlinked documents, the partitioning mechanism continually receives one or more new documents to be stored and managed in the database system, no specially designated partition in the database system is used to receive these new documents. In these embodiments, the partitioning mechanism receives a new document to be stored and managed in the database system. The partitioning mechanism may determine, for each partition in the (two or more) partitions in the database system, a number of new inter-partition links between the new document and that partition. The partitioning mechanism can select, based on one or more factors, a particular partition in the two or more partitions to store the new document. An example of such factors may be how many links that the newly received document has to documents in that partition. Another example of such factors may be how full that partition currently is. In any event, the partitioning mechanism stores the new document into the selected partition of the database system.

The partitioning mechanism in various embodiments of the invention may be used regardless of the format used by interlinked documents. For example, the format may be HTML, XML, etc. The mechanism may also be used regardless of the contents of the interlinked documents.

EXAMPLE SYSTEM

FIG. 1 illustrates an example database system 100 that comprises a number of partitions (102-1 through N) each of which may be used to store zero or more interlinked documents, in accordance with an embodiment of this description. For the purpose of explanation, these documents may be, but are not limited to, XML documents.

The database system (100) may be of any type. In an embodiment, for example, the database system may be, but is not limited to, a distributed system that comprises one or more clusters each of which comprises multiple nodes. In such a distributed system, a partition may be a unit of storage or a computing node that is attached with one or more units of storage as well as one or more processors. Each computing node may comprise additional resources such as memory, networking interface, operating system, software modules, etc.

For the purpose of illustration, the database system 100 may, but is not limited to, partition itself in different ways over the time (dynamically). For example, initially, the database system 100 may comprise a single partition. This single partition may be divided into two or more partitions over time. Furthermore, new computing resources may be continually added to the database system 100. The newly added computing resources may be added to existing partitions to increase their capacities. The newly added computing resources may also be used to create brand new partitions.

Likewise, two or more existing partitions in the database system 100 may be combined to form one large partition, thereby decreasing the number of partitions in the system 100, as time goes.

In some embodiments, the database system manages the partition 102 through a distributed software application (or middleware). Processing logic that is associated with a partition, say 102-1, may communicate with other processing logic that is associated with a different partition, say 102-2, through communication links in the database system 100. For example, through such a communication link, statistics collected at one partition (such as query statistics in various levels of detail) may be shared at another partition. Also, a document located on one partition may be moved to another partition by the partitioning mechanism.

For the purpose of illustration, each partition 102 may be identified by a unique identifier among all the partitions in the database system 100. Documents in a particular partition 102 may carry a corresponding unique identifier that identifies the particular partition 102. Thus, for the purpose of illustration, when a document is moved from one partition 102 to another partition 102, the name of the document will change from carrying the former partition's unique identifier to carrying the latter partition's unique identifier.

EXAMPLE INTERLINKED DOCUMENTS

Figure 2A:
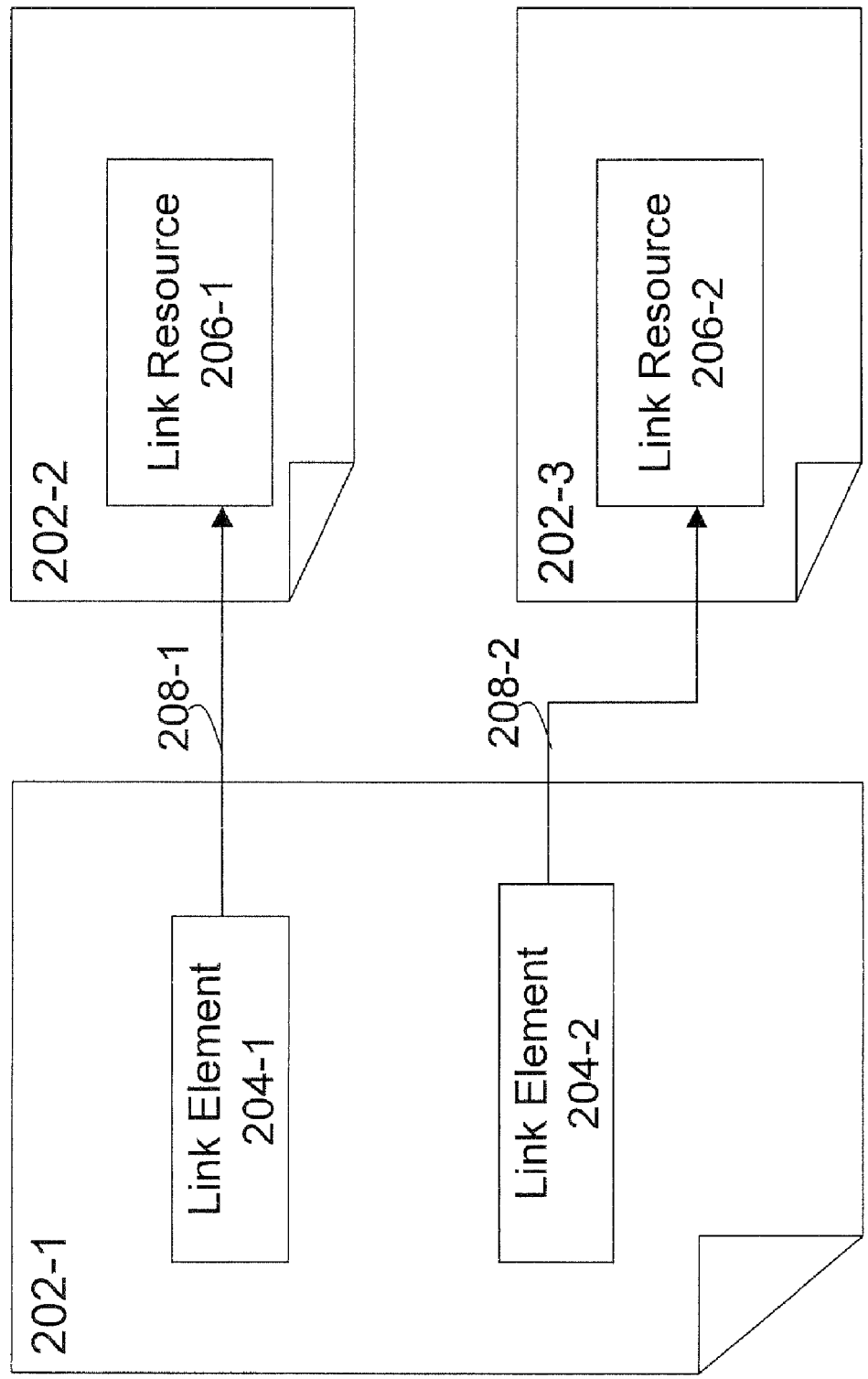
FIG. 2A is a block diagram of example interlinked documents, in accordance with an embodiment of the present invention.

FIG. 2A illustrates example interlinked documents 202, in accordance with an embodiment of the present invention. An interlinked document may, but is not limited to, be any particular type; an interlinked document may be any type of documents in which links 208 (or linking relationships) may be defined. For example, interlinked documents (or files) may be XML documents, HTML documents, documents or files that constitute resources that participate in the links 208, or a combination thereof. TABLE 1 and TABLE 2 illustrate two example department documents for IT department and HR department, respectively.

TABLE 1

Department Document - it.xml (IT)

```
<department xlink=http://www.w3.org/1999/xlink>
    <name>Information Technology</name>
    <location>Building 100</location>
</department>
```

TABLE 2

Department Document - hr.xml (HR)

```
<department xlink=http://www.w3.org/1999/xlink>
    <name>Human Resources</name>
    <location>Building 300</location>
</department>
```

Likewise, TABLEs 3 through 5 below illustrate three example employee documents for Alice, Bob, and Scott, respectively.

TABLE 3

Employee Document - alice.xml (Alice)

```
<employee xlink=http://www.w3.org/1999/xlink>
    <name>alice</name>
    <dept xlink:href="hr.xml"/>
</employee>
```

TABLE 4

Employee Document - bob.xml (Bob)

```
<employee xlink=http://www.w3.org/1999/xlink>
    <name>bob</name>
    <dept xlink:href="it.xml"/>
</employee
```

TABLE 5

Employee Document - scott.xml (Scott)

```
<employee xlink=http://www.w3.org/1999/xlink>
    <name>scott</name>
    <mgr xlink:href="bob.xml"/>
    <dept xlink:href="it.xml"/>
</employee>
```

As used herein, a "link" between two documents refers to a link relationship between the two documents. For example, where the XML Link language (XLink) is used, a link 208 may be defined as a pair of a link element (204) in one document and a link resource (206) in another document. For example, for the employee documents illustrated in TABLEs 3 through 5, a link element (204) is in the form of a "dept" link element that conforms to a schema located at an HTTP address of ". . . w3. org/1999/xlink" as indicated in TABLEs 3 through 5. Likewise, the documents that are pointed by these link elements (i.e., "dept" link elements) are link resources (206).

A link element, say 204-1, may be, but is not limited to, an XML element (embedded in an XML document, for example, 202-1) that conforms to the specification of XLink. The link element 204-1 may, but is not limited to, use a uniform resource identifier (URI) notation to refer to a link resource such as 206-1. A link resource may be an entire document or a portion of a document. A link resource or a document comprising a link resource may be an XML document, or may be a non-XML document such as an image file, an HTML document, etc.

An interlinked document 202 may contain one or more links 208, each of which may be associated with a link element 204 and a link resource 206. As used herein, the term "contain one or more links" refers to that the document contains the link elements that are associated with the one or more links. Thus, in various embodiments, an interlinked document 202 may contain one link, two links, three links, etc. For the purpose of illustration, an interlinked document 202-1 in FIG. 2A contains two links 208.

Types of individual links associated with link elements in an interlinked document may, but are not limited to, be different. For example, the first of the two links, 208-1 as illustrated in FIG. 2A, may have a type of link as "manager". Accordingly, the link 208-1 is associated with a link element 204-1, which may be a URL that specifies a link resource 206-1 in another document 202-2. The link resource 206-1 may provide manager information such as a manager name. Likewise, the second of the two links, 208-2 as illustrated in FIG. 2A, may have a type of link as "department". Accordingly, the link 208-2 is associated with a link element 204-2, which may be a different URL that specifies a link resource 206-2 in a third document 202-3. The link resource 206-2 may provide department information such as a department name.

Interlinked Documents in Partitions

Figure 2B:
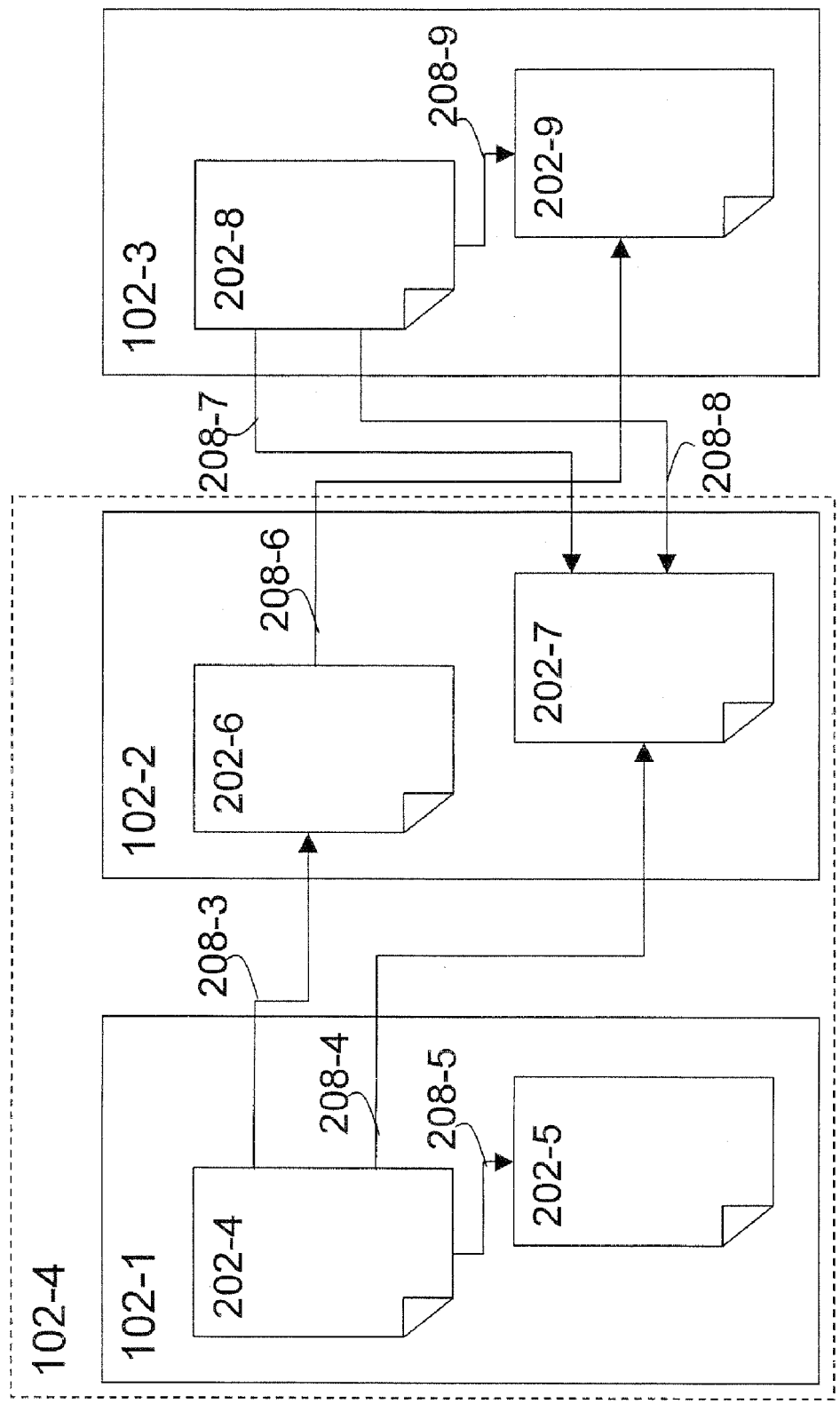
FIG. 2B is another block diagram of example interlinked documents, in accordance with an embodiment of the present invention.

FIG. 2B illustrates example (database) partitions where multiple interlinked documents may be stored by a partitioning mechanism in accordance with an embodiment of the present invention. For the purpose of illustration, three partitions are shown in FIG. 2B, which may correspond to the partitions (102-1, 102-2 and 102-3) illustrated in FIG. 1.

In some embodiments, an interlinked document 202 in a partition 102 may comprise (zero, one, or more) inter-partition links 208 to interlinked documents 202 in other partitions 102, as well as (zero, one, or more) intra-partition links 208 to interlinked documents 202 in the same partition 102.

For example, as illustrated in FIG. 2B, a document 202-4 in the partition 102-1 comprises two inter-partition links 208-3 and 208-4, as well as an intra-partition link 208-5. In this example, both inter-partition links 208-3 and 208-4 point to link resources in documents (i.e., 202-6 and 202-7) in the partition 102-2, while the intra-partition link 208-5 points to a link resource in a document 202-5 in the same partition (102-1).

Likewise, a document 202-8 in the partition 102-3 comprises two inter-partition links 208-7 and 208-8, as well as an intra-partition link 208-9. In this instance, inter-partition links 208-7 and 208-8 both point to link resources (which may correspond to different portions or scopes of content) in the same document (i.e., 202-7) in the partition 102-2, while the intra-partition link 208-9 points to a link resource in a document 202-9 in the same partition (102-3).

A document may be used by multiple other documents as a (link) resource provider. For example, as illustrated in FIG. 2B, a document such as 202-7 may provide link resources 206 to both documents 202-4 and 202-8. Also, a document 202 that provides link resources 206 to other documents 202 may also contain link elements 204 that point to some other documents 202. For example, as illustrated in FIG. 2B, a document such as 202-6 provides link resources 206 to the document 202-4 on one hand, but contains a link element 204 that points to the document 202-9 on the other hand. Thus, links between documents may be nested, multi-leveled, reciprocally linked, etc.

Initial Partitioning

In some embodiments, the partitioning mechanism may receive a large collection of interlinked documents to be stored and managed by the database system 100. This large collection of interlinked documents may be stored in a small set of partitions initially. For example, for the purpose of illustration, this collection of interlinked documents initially may be stored in a single partition 102 of the database system 100.

Figure 3A:
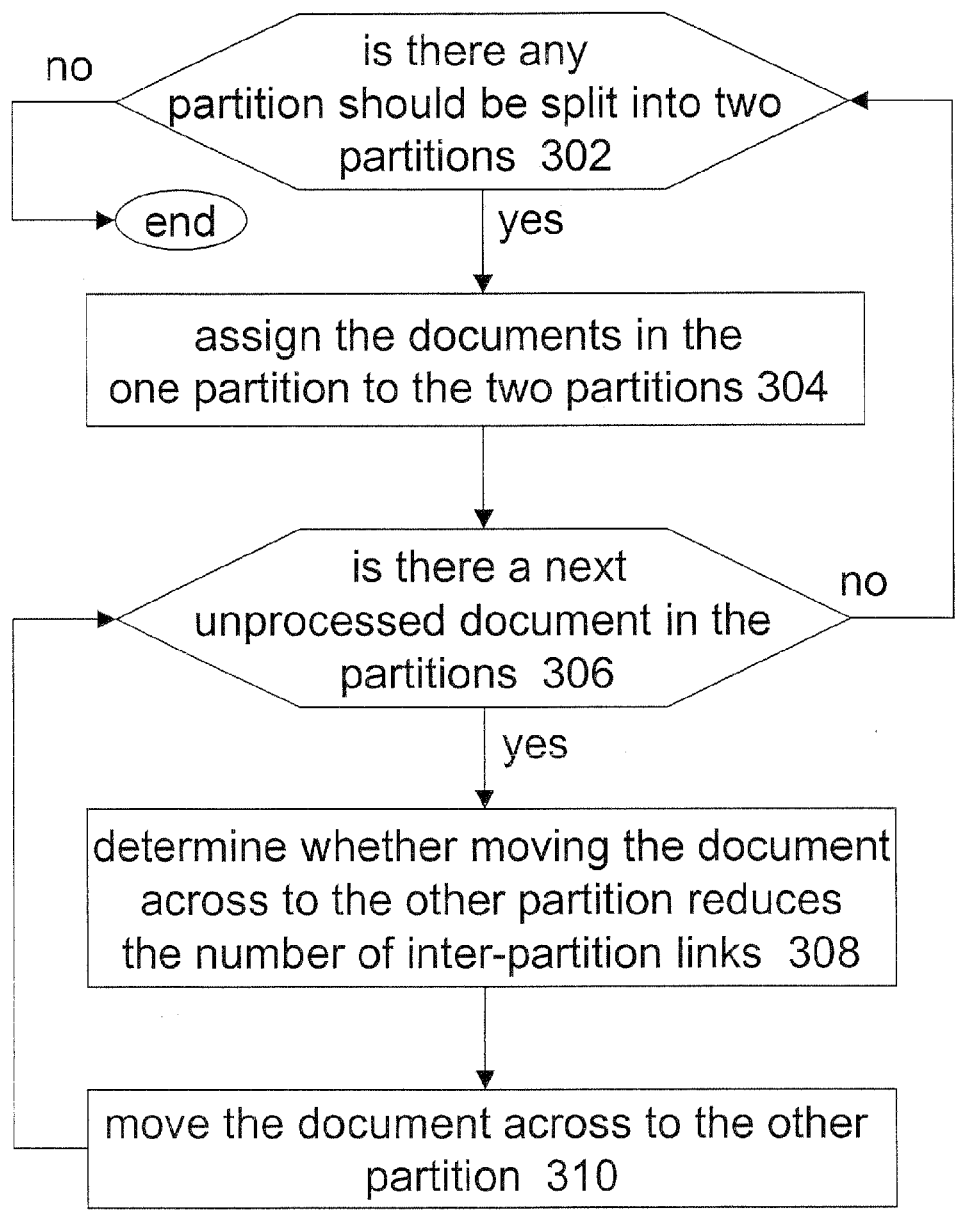
FIG. 3A, FIG. 3B and FIG. 3C are example flow diagrams, according to embodiments of the present invention.

In accordance with an embodiment of the present invention, the collection of interlinked documents that are initially stored in a small set of partitions may split into a large set of partitions. For the purpose of illustration, FIG. 3A shows an example process of partitioning a (large) collection of interlinked documents initially in one partition into multiple partitions, in accordance with an embodiment of the present invention. In block 302, the partitioning mechanism determines whether any partition 102 should be split into two partitions 102. The partitioning mechanism may determine that a partition needs to be split based on a number of reasons. For example, the partitioning mechanism may determine that a partition currently stores too many documents and that some of the documents on the partition should be moved to a different partition. Also, the partitioning mechanism may determine to use a new partition that has been made available by the database system 100. Accordingly, the partitioning mechanism may determine that a partition that currently holds the highest number of documents should be split to make use of the newly available partition.

For example, referring to FIG. 2B, documents in partitions 102-1 and 102-2, for example, may initially be in a single partition 102-4. For the purpose of illustration, the partitioning mechanism may determine that the documents in the single partition 102-4 should be split into two partitions such as partition 102-1 and 102-2.

Consequently, in block 304, the partitioning mechanism assigns the documents in the one partition 102 to the two partitions 102. In some embodiments, the original occupied partition 102 is used by the partitioning mechanism to create the two partitions 102 (for example, some unused space is designated as a separate, new partition). In some other embodiments, the one partition 102 becomes one of the two partitions while a new partition 102 is added as the other of the two partitions 102.

In any event, since the assigning (or partitioning) of the documents from the one partition 102 to the two partitions 102 is random, there may be a large number of inter-partition links 208 between the documents in the two partitions 102 as a result. For example, referring to FIG. 2B, the partitioning mechanism may assign the documents in the single partition 102-4 to partitions 102-1 and 102-2. Since the documents are assigned, there may be a large number of inter-partition links 208 between the documents in partitions 102-1 and 102-2 as a result.

In block 306, the partitioning mechanism iterates over all documents in the partitions using the following steps. For each document in partitions 1 and 2, in block 308, the partitioning mechanism determines whether moving the document across to the other partition reduces the number of inter-partition links. If so, the partitioning mechanism moves the document across to the other partition in block 310. On the other hand, if moving the document across to the other partition does not reduce the number of inter-partition links, the document is not moved. In an embodiment, the partitioning mechanism may count inter-partition links of a document in one of the two partitions to documents in the other of the two partitions, as well as intra-partition links of the document to other documents in the same partition. If the number of inter-partition links of the document is greater than the number of intra-partition links of the document, the partitioning mechanism in one embodiment moves the document to the other partition. As a result, the previous inter-partition links become new intra-partition links, while the previous intra-partition links become new inter-partition links. Since the number of the new inter-partition links, i.e., the previous intra-partition links, is fewer than the number of the previous inter-partition links, the total number of inter-partition links is reduced.

In block 308, only intra-partition links and inter-partition links between the partitions (i.e., the two partitions into which the collection of interlinked documents in the original partition has been previously assigned) are considered; inter-partition links to other partitions other than the two partitions are ignored for determining whether a document in one of the paired partitions should be moved to the other of the paired partitions. For example, referring to FIG. 2B, the partitioning mechanism may iterate over all the documents in partitions 102-1 and 102-2 and determine whether any of the documents in one of the two partitions should be moved to the other of the two partitions. In an embodiment, the partitioning mechanism may look at document 202-4 and counts the number of inter-partition links of document 202-4 as well as the number of intra-partition links of the same document. Next the partitioning mechanism determines whether the number of inter-partition links is greater than the number of intra-partition links. In this present example, document 202-4 has two inter-partition links (208-3 and 208-4) and one intra-partition link (208-5). Since the number of inter-partition links is greater than the number of intra-partition links, the partitioning mechanism in an embodiment moves document 202-4 to the other partition of the two partitions, i.e., to partition 102-2.

On the other hand, the partitioning mechanism determines that it is not necessary to move document 202-5, because such a move would not reduce inter-partition links using the same steps as described above.

As a result, some interlinked documents are moved from one partition to the other partition because moving them reduces the number of the inter-partition links, while some other interlinked documents are not moved because moving them does not reduce the number of the inter-partition links. Consequently, the overall number of inter-partition links is reduced, as compared with the previous overall number of inter-partition links.

In some embodiments, this iteration (from block 306 to block 310) may be repeated for a number of times (0, 1, 2, or more times, or up to a user configurable time) to result in a converged solution of a much reduced number of inter-partition links between documents in the two partitions 102. For example, in the present example, iterating over the documents in partitions 102-1 and 102-2 may be repeated for a number of times, say 3.

As illustrated in FIG. 3A, the foregoing steps starting from block 302 may be repeated until the number of partitions reaches a desired number. For example, in the present example, the partitioning mechanism may determine, in block 302, that partition 102-3 should also be split into two partitions. Consequently, blocks 304 through 310 may be repeated for partitioning the documents on partition 102-3. Similarly, if either of partitions 102-1 and 102-2 should be split, blocks 304 through 310 may also be repeated for these partitions.

Using a New Partition to Store New Documents

In some embodiments, while the partitioning mechanism partitions a large collection of interlinked documents in multiple partitions, new documents may be (e.g., continuously) received by the partitioning mechanism for the purpose of being stored into the database system 100. In some embodiments, the partitioning mechanism may use a new partition (such as 102-N of FIG. 1) as a holding place to store these new documents until a next re-partitioning that takes into account the new documents in the new partition. Under this approach, the multiple partitions other than the new partition (i.e., all partitions except 102-N, as illustrated in FIG. 1) still are not disturbed. Thus, if these partitions (other than the new partition—i.e., all partitions except 102-N, as illustrated in FIG. 1) were in an optimal state, these partitions remain so as far as how documents therein are partitioned.

Example Incremental Partitioning

Figure 3B:
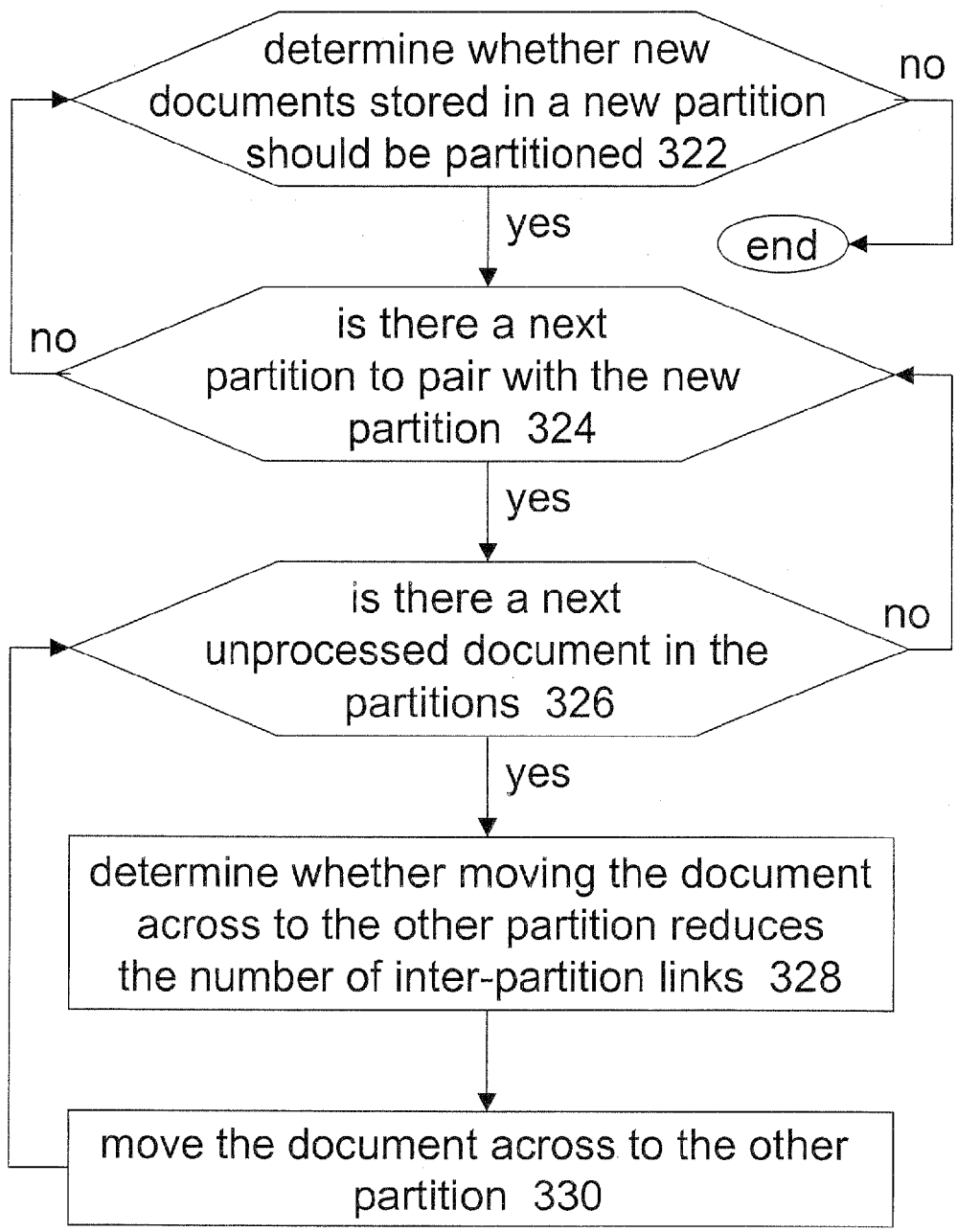

FIG. 3B illustrates an example process of partitioning newly received interlinked documents that have not been taken into account in a previous partitioning of interlinked documents. For example, the database system 100 may have already performed initial partitioning of the previously received interlinked documents (in partitions 102 other than 102-N, as illustrated in FIG. 1). New interlinked documents stored in a new partition such as 102-N, while containing links to partitions 102 other than 102-N, may not have been taken into account in a previous partitioning.

In block 322, the partitioning mechanism determines whether the new documents stored in the new partition (i.e., 102-N) should be partitioned. In an embodiment, the partitioning mechanism may determine that a sufficient amount of time has lapsed, and hence the new documents stored in the new partition should now be partitioned. In another embodiment, the partitioning mechanism may determine that a sufficient number of new documents have been received and stored in the new partition, and hence the documents in the new partition should be re-partitioned. In yet another embodiment, both a time limit and a-number-of-documents limit may be combined to determine whether the documents in the new partition should be re-partitioned. For example, the partitioning mechanism may determine that a re-partitioning is appropriate for the new partition, when either a sufficient amount of time has lapses or a sufficient number of new documents have been received.

In block 324, the partitioning mechanism iterates over all partitions 102 other than the new partition. Referring to FIG. 1, the partitioning mechanism would iterate over all partitions 102 other than 102-N. In block 326, for each such partition 102 (e.g., 102-1, 102-2, 102-3, etc., except 102-N), the partitioning mechanism iterates all the documents in that partition 102 (e.g., 102-2) and the new partition (i.e., 102-N in the present example). In block 328, for each such document, the partitioning mechanism determines whether moving the document across to the other partition reduces the number of inter-partition links. If so, the partitioning mechanism moves the document across to the other partition in block 330. On the other hand, if moving the document across to the other partition does not reduce the number of inter-partition links, the document is not moved. In an embodiment, the partitioning mechanism uses the same approach as described previously with respect to partitions 102-1 and 102-2 to determine whether to move a document between the partition being iterated and the new partition. In block 328, only intra-partition links and inter-partition links between the paired partitions (i.e., the partition is being iterated and the new partition) are considered; inter-partition links to other partitions are ignored for determining whether a document in one of the paired partitions should be moved to the other of the paired partitions.

Incremental Partitioning Without Using a New Partition

In some embodiments, when new documents are (e.g., continuously) received by the partitioning mechanism to be stored in the database system 100 after the partitioning mechanism has partitioned a large collection of interlinked documents in multiple partitions (which, for example, may be 102-1 through N in FIG. 1), the partitioning mechanism may avoid using a new partition 102 to hold these new documents. Instead, under this approach, the multiple partitions (i.e., 102-1 through N in FIG. 1) may be used on-the-fly to accommodate the new documents (i.e., the database system 100 may be kept online while it stores the new documents into its existing partitions).

Figure 3C:
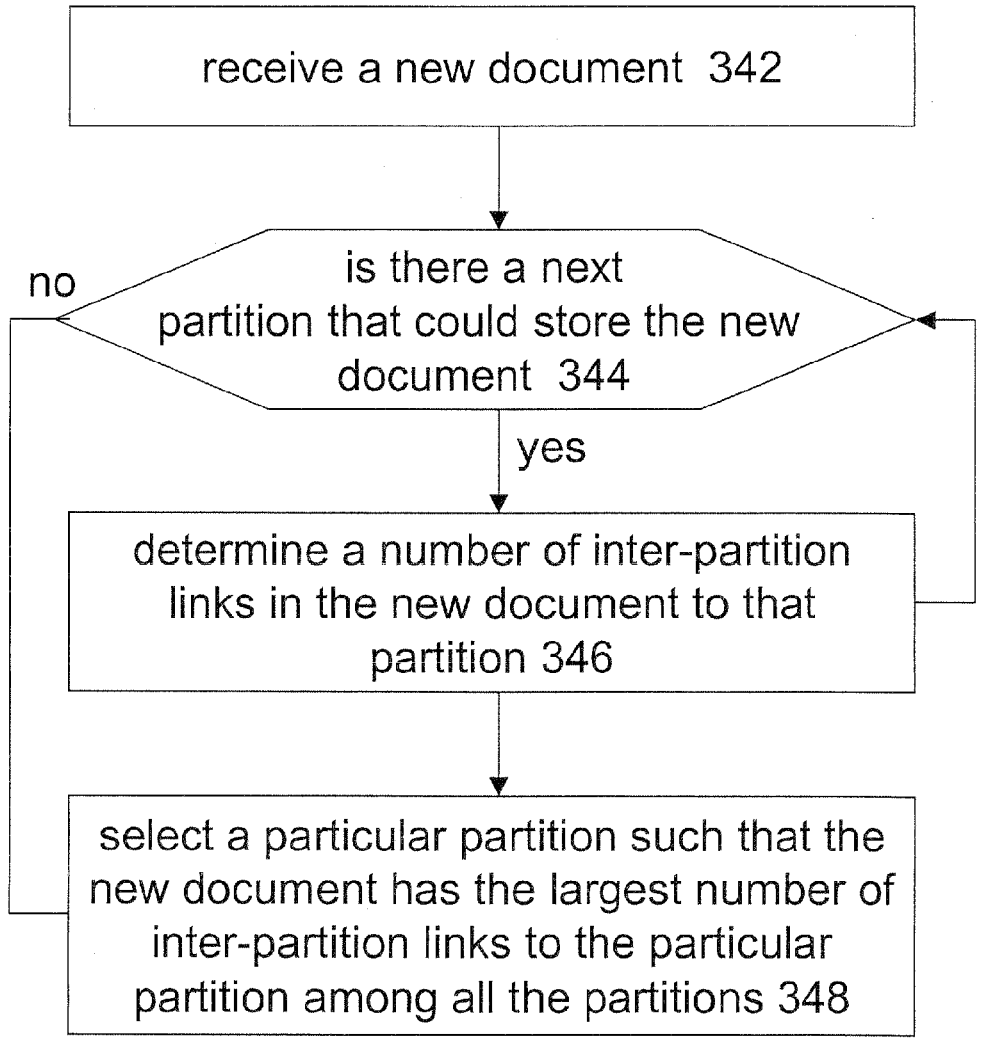

FIG. 3C illustrates an example process of partitioning new interlinked documents that are received after the database system 100 already performed initial partitioning of the previously received interlinked documents, without using a new partition.

In block 342, the partitioning mechanism receives a new document. In block 344, the partitioning mechanism iterates over all partitions 102. For example, referring to FIG. 1, the partitioning mechanism would iterate over all partitions 102-1 through N. In block 346, for each such partition 102 (e.g., 102-1 through N), the partitioning mechanism determines a number of inter-partition links in the new document to that partition. After the iteration over all the partitions 102 is finished for the new document, in block 348, the partitioning mechanism selects a particular partition among all the partitions 102 such that the new document has the largest number of inter-partition links to the particular partition among all the partitions 102.

For the purpose of illustration, in the above example processes, it has been described that to determine whether a document should be moved from one partition to another partition, a number of inter-partition links and a number of intra-partition links contained in that specific document are counted and compared. In other words, whether a document should be moved is determined on the basis of what are contained in that document. It should be noted that this description is for illustration purposes only. Other ways of determining whether a document should be moved can be used. For example, instead of counting links on a basis of each individual document, inter-partition links and intra-partition links may be counted for all documents that are of a specific document type. Under this approach, the inter-partition links and the intra-partition links for all the employee documents that are of the specific document type (e.g., document type: employee) may be compared. Thus, these and other variations of counting links are within the scope of this invention.

For the purpose of illustration, in the above example processes, it has been described that documents in one partition may be initially assigned to two partitions. It should be noted that this is for illustration purposes only. A different number of partitions may be used for initially assigning documents. For example, instead of two partitions, three or more partitions may be used to receive these assigned documents from an original one partition. Under this approach, for each partition in the three or more partitions, any two of the three or more partitions may be paired together. The same process that applies to two partitions in the previous description may be used to perform inter-partition link reduction with respect to each such pair of the three or more partitions. Alternatively, inter-partition links from one partition to each of the other partitions and intra-partition links within each of all the partitions may be counted and compared on a basis of individual document, on a basis of individual document type, etc. These links may be used to determine whether a document, a document type, etc., should be moved to a particular partition in the three or more partitions. Thus, using two, three or more partitions for the purpose of initially receiving assigned documents are all within the scope of this invention.

For the purpose of illustration, counting links in a document has been described as counting link elements in the document. It should be noted that this is for illustration purposes only. Other ways of counting links may be used. For example, instead of counting link elements, link resources may instead be counted and used for the purpose of determining a number of inter-partition links and a number of intra-partition links for a document. Also, both link elements and link resources may be counted for the purpose of determining a number of inter-partition links and a number of intra-partition links for a document. Thus, these and other variations of counting links are all within the scope of the present invention.

For the purpose of illustration, an inter-partition link has been treated no different from every other inter-partition link. Similarly, for the purpose of illustration, an intra-partition link has been treated no different from every other intra-partition link. It should be noted that this is for illustration purposes only. Links may be treated differently. For example, an individual weight factor may be assigned to links on a per-link basis or on a per-type-of-link basis, as will be further explained. Thus, these and other ways of treating links are within the scope of the present invention.

Preferred Links

An interlinked document may contain many different types of links with other interlinked documents. As used herein, the term "a type of link" refers to a link relationship that may depend on link properties (which, for example, may be defined by types of link elements or types of link resources, or attributes defined in link elements or link resources). In addition, a type of link may also depend on the context in which an associated link is defined. That is, even if two links are of a same type of link elements (with same attributes), the two links nonetheless may be different. This may be so because the link elements (thus a corresponding link) are respectively contained in (or pointed from) different types of documents. For example, a link element "manager" that is contained in an employee document may be semantically different from a link element "manager" that is contained in a department document because these two link elements "manager" are contained in the two documents of different types.

Even if two link elements are of a same type and even if they are in documents of a same type or even in a same document, links associated with the two link elements may still be of different types from each other. This is so because positions of the links or link elements in the document(s) may be different, thereby signifying different semantic meanings or different types of links. For example, a link element "manager" near a root element, say two levels away, in a document may be semantically different from another link element "manager" that is far away, say five levels away, from the root element. The links may be in different contexts, and therefore of different types, depending on their distances to the root element.

In some embodiments, for different types of links, different weight factors may be assigned. In a particular embodiment, preferred links are assigned higher values of weight factors than other links. In some embodiment, the partitioning mechanism provides a way for a user to configure different weight factors for different types of links. For example, a configuration file may be created or updated by a user that defines different sets of criteria for different types of links and their respective (values of) weight factors (which may, but are not limited to, be different).

In those embodiments where weight factors are used, when determining whether moving a particular document or a particular type of document from one partition to a different partition reduces the number of inter-partition links between the two partitions, weight factors are used in making such determining.

For example, a user can configure and assign weight factors to links as follows: the weight factor for a "manager" type of link is 1, but the weight factor for a "department" type of link is 0. Thus, in a particular embodiment, all links of the "department" type are ignored in determining whether moving a document reduces the number of inter-partitioning links because their weight factors are zero, while all links of the "manager" type are fully accounted for in the same determining.

For the purpose of illustration, values of weight factors have been described as having 0 or 1. It should be noted that this is for illustration purposes only. Other values of weight factors may be used. For example, a "manager" type of link may be assigned a weight of 0.8 instead of 1. As a result, the number of links of the "manager" type in determining whether moving a particular document or documents of a particular type is multiplied by 0.8 instead of 1. Thus, these and other values of weight factors or other ranges of values of weight factors are all within the scope of the present invention.

For the purpose of illustration, it has been described that a user may configure different weight factors for different types of links. It should be noted that this is for illustration purposes only. Other ways of specifying or configuring weight factors may be used. For example, the partitioning mechanism may set defaults weight factors for one or more types of links. A user may choose to change weight factors from their default values. Also, the partitioning mechanism may programmatically assign different weight factors to different types of links based on statistical information on how frequently those links are actually traversed by queries, as will be further explained below. Thus, these and other variations of assigning or configuring different weight factors to different types of links are all within the scope of the present invention.

For the purpose of illustration, links have been described to be different because they are associated with different link elements (or tags), or with different documents, or having different distances to a root element. It should be noted that this is for illustration purposes only. Other types of defining different types of links may be used. For example, the partitioning mechanism can use a parser that detects whether a particular link element in a particular document satisfies a set of criteria for being associated with a particular type of link, using contextual information in the particular document, other than distances to a root document, etc. Therefore, these and other variations of defining and detecting (or determining) types of links are all with the scope of the present invention.

Auto Statistics

In some embodiments, the partitioning mechanism can be configured to be in an "auto-statistics" mode, i.e., the mechanism collects statistics about which links are being traversed by queries issued to retrieve information from the collection of inter-linked documents. After a certain period of time, based on the statistics collected, the mechanism computes the (link) weight factors (which may be used along with numbers of links, as previously described, in determining whether a particular document or documents of a particular type should be moved from one partition to another partition) and uses the weight factors to further partition the collection. In some embodiments, as a result of different weight factors for different types of links, documents in the collection may, but are not limited to, collocate with other documents of the same type.

This is particularly useful in situations where the link weight factors as described above cannot be manually configured, perhaps due to a large number of links or link types, or perhaps because the collection of documents may be gathered in an ad-hoc manner and the user would not know likelihoods/probabilities of link traversals in queries a priori.

In some embodiments, one or more counters may be used to gather the number of traversal by queries for each type of link. Counters may be kept on a per document basis or on a per type-of-document basis. After the certain period of time, the partitioning mechanism has link statistics that may be used to compute the weight factors. In an embodiment, a weight for a type of link may be computed as $N_i/\Sigma N_k$, where $N_i$ is the number of traversal for an i-th type of link and $\Sigma N_k$ is the total number of traversal for all types of links.

Once the statistic information is gathered, calculation of weight factors and subsequent determination of whether to move documents from partition to partition may be performed when the database system is either online or offline. For example, the database system may be kept online while any of the previously described processes as shown in FIG. 3A, FIG. 3B, and FIG. 3C is running. Furthermore, if this new partitioning or re-partitioning takes one day, then, in a particular embodiment, incremental changes that are accumulated during that day may be used as a part of next statistic information gathering and for next partitioning or re-partitioning.

In particular, this new partitioning or re-partitioning may be performed while the database system continuously receives new documents. For example, the new documents may be temporarily stored in a new partition as noted before. After the new partitioning or re-partitioning is finished, these incremental addition to the collection of documents may be re-partitioned in accordance with an example process flow as illustrated in FIG. 3C. This partitioning of incrementally added documents may use the weight factors that have been determined for the existing documents in a particular embodiment.

In an alternative embodiment, the database system may be taken offline or, even though online, may be limited to read accesses during the new partitioning or re-partitioning.

In the embodiments where weight factors are used, the number of inter-partition links is not necessarily a whole number. Rather, each inter-partition link multiplied by its weight factor is used as a contribution from that inter-partition link to a weighted summation from all inter-partition links counted. Thus, determining whether moving one or more of the first documents in the first partition to the second partition reduces the number of inter-partition links between the first partition and the second partition is the same as determining whether moving one or more of the first documents in the first partition to the second partition reduces a weighted summation of all numbers of inter-partition links, as weighted by multiplication with their weight factors, between the first partition and the second partition. Therefore, in some embodiments, some links may be fully accounted for in this determination if their weight factors are one; some links may be ignored in the same determination if their weight factors is zero; and still some links may be partially accounted for in the determination if their weight factors fall somewhere between zero and one.

Namespace

Namespace specifications may be used as a basis for determining a weight factor. For example, as illustrated in TABLE 6 and TABLE 7, both the employee document and the department document therein are in Oracle namespace. On the other hand, as illustrated in TABLE 8 and TABLE 9, both the employee document and the department document therein are in Acme namespace. Thus, even though the two employee documents are of a same type and the two department documents are of another same type, links in these documents may be assigned different weight factors based on the links' namespaces.

TABLE 6

Employee Document in Oracle Namespace

```
<employee xmlns=http://xmlns.oracle.com
xlink=http://www.w3.org/1999/xlink>
    <name>scott</name>
    <dept xlink:href="it.xml"/>
...
</employee>
```

TABLE 7

Department Document in Oracle Namespace

```
<department xmlns=http://xmlns.oracle.com
xlink=http://www.w3.org/1999/xlink>
    <name>Information Technology</name>
    <location>Building 100</location>
</department>
```

TABLE 8

Employee Document in Acme Namespace

```
<employee xmlns=http://xmlns.acme.com
xlink=http://www.w3.org/1999/xlink>
    <name>John</name>
    <dept xlink:href="plumbing.xml"/>
...
</employee>
```

TABLE 9

Department Document in Acme Namespace

```
<department xmlns=http://xmlns.acme.com
xlink=http://www.w3.org/1999/xlink>
    <name>Plumbing</name>
    <location>Basement</location>
</department>
```

For example, if an employee document references/contains two "dept" links but one of the "dept" links has the same namespace specification as the referencing employee document, that "dept" link may be assigned a high-value weight factor. On the other hand, if the other "dept" link therein has a different namespace specification as the referencing employee document, the other "dept" link may be assigned a low-value weight factor.

In alternative embodiments, a namespace specification (either implicit or explicit) of an ancestor element that encloses a link element may be used to determine whether the link element should be assigned a relatively low- or a relatively high-value weight factor. For example, if the root element that encloses a link element specifies an Oracle namespace but the link element specifies a different namespace, a low-value weight factor may be assigned to a link that is associated with the link element. In another embodiment, if the immediate parent element that encloses a link element specifies a same namespace as the link element, a link that is associated with the link element may be assigned a high- or a low-value weight factor, as the case may be. Therefore, all these variations of assigning weight factors based at least in part on namespace specifications involved in a link element, in an ancestral element, in a document, etc. may be within the scope of the present invention.

Hardware Overview

Figure 4:
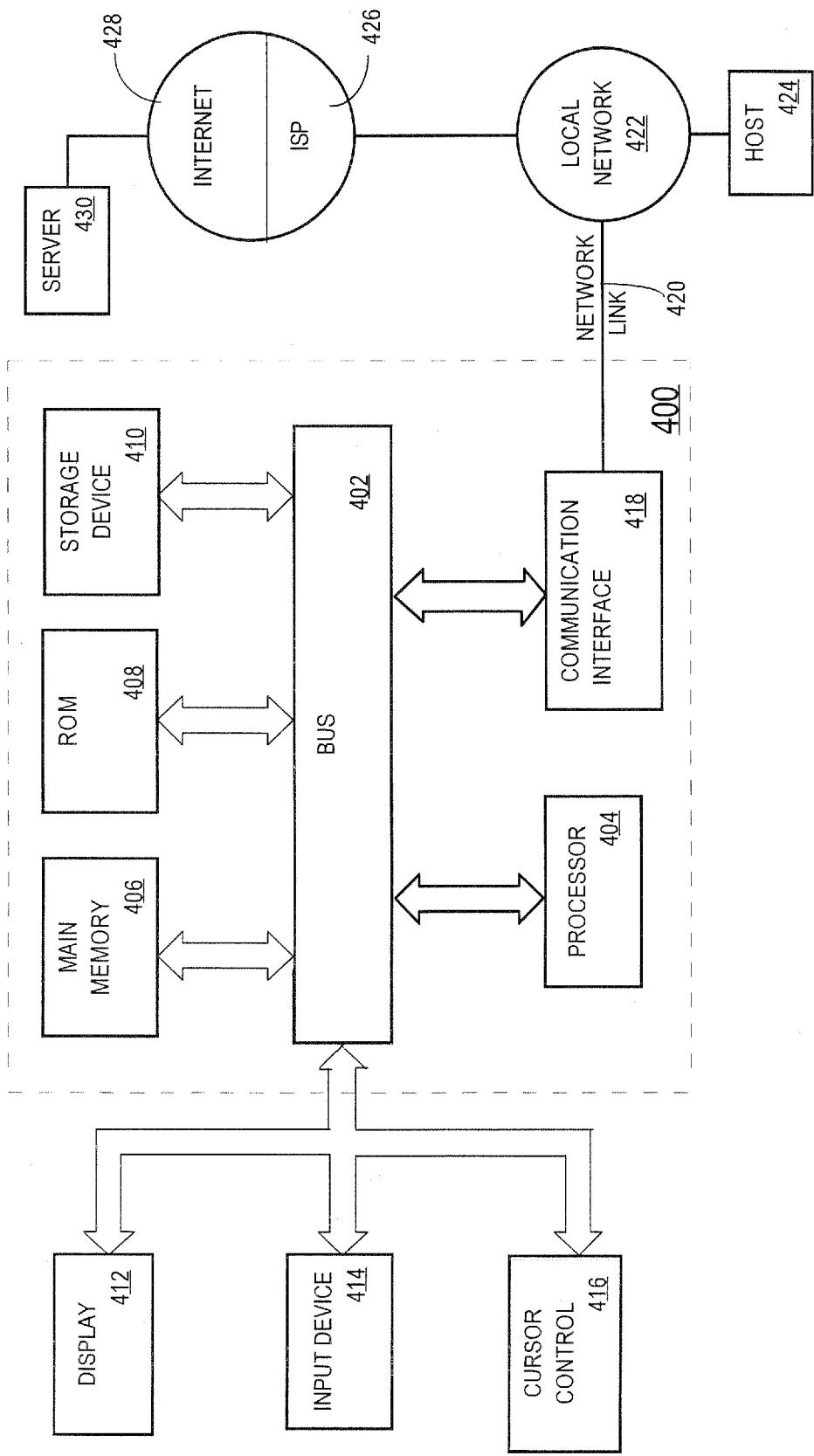
FIG. 4 is a block diagram of a system upon which the techniques described herein may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for partitioning inter-linked documents into partitions of a database system, comprising:
   storing a plurality of documents in two or more partitions in the database system, thereby forming a number of inter-partition links between a first partition and a second partition, wherein both the first partition and the second partition are included in the two or more partitions, wherein first documents are stored in the first partition, wherein second documents are stored in the second partition, and wherein both the first documents and the second documents are included in the plurality of documents;
   wherein the two or more partitions in the database system are managed by a partitioning mechanism of the database system;
   determining whether storing one or more of the first documents in the second partition instead of the first partition reduces the number of inter-partition links between the first partition and the second partition; and
   in response to determining that storing the one or more of the first documents in the second partition instead of the first partition reduces the number of inter-partition links between the first partition and the second partition, moving the one or more of the first documents from being stored in the first partition to being stored in the second partition, wherein said one or more of the first documents being stored in the first partition requires storing content of said one or more of the first documents in the first partition, and wherein said one or more of the first documents being stored in the second partition requires storing content of the said one or more of the first documents in the second partition.

2. The method of claim 1, wherein determining whether storing one or more of the first documents in the second partition instead of the first partition reduces the number of inter-partition links between the first partition and the second partition comprises determining, for each document in the one or more of the first documents in the first partition, whether storing that document to the second partition reduces the number of inter-partition links between the first partition and the second partition.

3. The method of claim 1, wherein the plurality of documents are of two or more document types and wherein determining whether storing one or more of the first documents in the second partition instead of the first partition reduces the number of inter-partition links between the first partition and the second partition comprises determining, for each document type in the two or more document types, whether storing documents of that document type in the second partition reduces the number of inter-partition links between the first partition and the second partition.

4. The method of claim 1, further comprising:
   determining whether storing one or more of the second documents in the first partition instead of the second partition reduces the number of inter-partition links between the first partition and the second partition; and
   in response to determining that storing the one or more of the second documents in the first partition instead of the second partition reduces the number of inter-partition links between the first partition and the second partition, storing the one or more of the second documents to the first partition.

5. The method of claim 1, further comprising:
   receiving one or more new documents in a new partition in the database system, thereby forming a number of new inter-partition links between the new partition and the two or more partitions, wherein the new partition is not in the two or more partitions;

performing, for each partition in the two or more partitions:
determining whether storing one or more of the new documents in that partition in the two or more partitions instead of the new partition reduces the number of new inter-partition links between the new partition and that partition; and
in response to determining that storing the one or more of the new documents in that partition in the two or more partitions instead of the new partition reduces the number of new inter-partition links between the new partition and that partition, storing the one or more of the new documents to that partition.

6. The method of claim 1, further comprising:
receiving a new document to be stored in the database system;
determining, for each partition in the two or more partitions, a number of new inter-partition links between the new document and that partition; and
selecting, based on one or more factors, a particular partition in the two or more partitions to store the new document.

7. The method of claim 1, wherein each of the links may be assigned a weight factor.

8. The method of claim 7, wherein the weight factor assigned to each of the links depends on a type of that link.

9. The method of claim 7, wherein the weight factor assigned to each of the links depends on a namespace specified in that link.

10. The method of claim 7, wherein the weight factor assigned to each of the links depends on how many traversals were made by one or more users of the database system on a type of link to which that link belongs.

11. A non-transitory computer-readable storage medium carrying one or more sequences of instructions which, when executed by one or more processors, causes the one or more processors to perform:
storing a plurality of documents in two or more partitions in a database system, thereby forming a number of inter-partition links between a first partition and a second partition, wherein both the first partition and the second partition are included in the two or more partitions, wherein first documents are stored in the first partition, wherein second documents are stored in the second partition, and wherein both the first documents and the second documents are included in the plurality of documents;
wherein the two or more partitions in the database system are managed by a partitioning mechanism of the database system;
determining whether storing one or more of the first documents in the second partition instead of the first partition reduces the number of inter-partition links between the first partition and the second partition; and
in response to determining that storing the one or more of the first documents in the second partition instead of the first partition reduces the number of inter-partition links between the first partition and the second partition, moving the one or more of the first documents from being stored in the first partition to being stored in the second partition, wherein said one or more of the first documents being stored in the first partition requires storing content of said one or more of the first documents in the first partition, and wherein said one or more of the first documents being stored in the second partition requires storing content of the said one or more of the first documents in the second partition.

12. The medium of claim 11, wherein determining whether storing one or more of the first documents in the second partition instead of the first partition reduces the number of inter-partition links between the first partition and the second partition comprises determining, for each document in the one or more of the first documents in the first partition, whether storing that document to the second partition reduces the number of inter-partition links between the first partition and the second partition.

13. The medium of claim 11, wherein the plurality of documents are of two or more document types and wherein determining whether storing one or more of the first documents in the second partition instead of the first partition reduces the number of inter-partition links between the first partition and the second partition comprises determining, for each document type in the two or more document types, whether storing documents of that document type to the second partition reduces the number of inter-partition links between the first partition and the second partition.

14. The medium of claim 11, further comprising:
determining whether storing one or more of the second documents in the the first partition instead of the second partition reduces the number of inter-partition links between the first partition and the second partition; and
in response to determining that storing the one or more of the second documents in the first partition instead of the second partition reduces the number of inter-partition links between the first partition and the second partition, storing the one or more of the second documents to the first partition.

15. The medium of claim 11, further comprising:
receiving one or more new documents in a new partition in the database system, thereby forming a number of new inter-partition links between the new partition and the two or more partitions, wherein the new partition is not in the two or more partitions;
performing, for each partition in the two or more partitions:
determining whether storing one or more of the new documents in that partition in the two or more partitions instead of the new partition reduces the number of new inter-partition links between the new partition and that partition; and
in response to determining that storing the one or more of the new documents in that partition in the two or more partitions instead of the new partition reduces the number of new inter-partition links between the new partition and that partition, storing the one or more of the new documents to that partition.

16. The medium of claim 11, further comprising:
receiving a new document to be stored in the database system;
determining, for each partition in the two or more partitions, a number of new inter-partition links between the new document and that partition; and
selecting, based on one or more factors, a particular partition in the two or more partitions to store the new document.

17. The medium of claim 11, wherein each of the links may be assigned a weight factor.

18. The medium of claim 17, wherein the weight factor assigned to each of the links depends on a type of that link.

19. The medium of claim 17, wherein the weight factor assigned to each of the links depends on a namespace specified in that link.

20. The medium of claim 17, wherein the weight factor assigned to each of the links depends on how many traversals were made by one or more users of the database system on a type of link to which that link belongs.

* * * * *

UNITED STATES PATENT AND TRADEMARK OFFICE
CERTIFICATE OF CORRECTION

PATENT NO.         : 8,260,832 B2
APPLICATION NO.    : 11/959288
DATED              : September 4, 2012
INVENTOR(S)        : Murthy Page 1 of 1

It is certified that error appears in the above-identified patent and that said Letters Patent is hereby corrected as shown below:

In column 20, line 19, in Claim 14, delete "the the" and insert -- the --, therefor.

Signed and Sealed this
Eighteenth Day of December, 2012

David J. Kappos
*Director of the United States Patent and Trademark Office*